(12) United States Patent
Alyaser

(10) Patent No.: US 10,752,841 B2
(45) Date of Patent: Aug. 25, 2020

(54) PYROLYSIS REACTOR

(71) Applicant: Enventix, Inc., San Jose, CA (US)

(72) Inventor: Monem H. Alyaser, San Jose, CA (US)

(73) Assignee: ENVENTIX, INC., San Jose, CA (US)

(*) Notice: Subject to any disclaimer, the term of this patent is extended or adjusted under 35 U.S.C. 154(b) by 637 days.

(21) Appl. No.: 14/920,530

(22) Filed: Oct. 22, 2015

(65) Prior Publication Data
US 2017/0114279 A1  Apr. 27, 2017

(51) Int. Cl.
| | | |
|---|---|---|
| *C10B 49/02* | (2006.01) | |
| *B01J 19/12* | (2006.01) | |
| *C10B 53/02* | (2006.01) | |
| *C10B 1/04* | (2006.01) | |
| *C10B 19/00* | (2006.01) | |
| *C10B 53/07* | (2006.01) | |
| *B01F 5/02* | (2006.01) | |
| *B01F 7/00* | (2006.01) | |
| *C10B 7/06* | (2006.01) | |
| *C10B 7/10* | (2006.01) | |
| *C10B 7/14* | (2006.01) | |
| *C10B 25/20* | (2006.01) | |
| *C10B 33/12* | (2006.01) | |
| *C10B 43/02* | (2006.01) | |
| *C10B 45/00* | (2006.01) | |

(52) U.S. Cl.
CPC ........... *C10B 19/00* (2013.01); *B01F 5/0206* (2013.01); *B01F 7/0025* (2013.01); *B01F 7/00391* (2013.01); *C10B 1/04* (2013.01); *C10B 7/06* (2013.01); *C10B 7/10* (2013.01); *C10B 7/14* (2013.01); *C10B 25/20* (2013.01); *C10B 33/12* (2013.01); *C10B 43/02* (2013.01); *C10B 45/00* (2013.01); *C10B 49/02* (2013.01); *C10B 53/02* (2013.01); *C10B 53/07* (2013.01); *B01J 19/126* (2013.01); *Y02P 20/143* (2015.11)

(58) Field of Classification Search
CPC ... C10B 49/02; C10B 49/00–22; C10B 47/02; C10B 47/04; C10B 47/06; C10B 47/16; C10B 47/18; C10B 47/20; C10B 47/22; C10B 47/24; C10B 53/00; C10B 53/02; C10B 53/06; C10B 53/07; C10B 53/08; B01J 19/08; B01J 19/12; B01J 19/126; C10G 1/02
See application file for complete search history.

(56) References Cited

U.S. PATENT DOCUMENTS

| | | | | |
|---|---|---|---|---|
| 1,739,786 A * | 12/1929 | Dieterle | ................. | C10B 47/20 201/34 |
| 2,131,702 A * | 9/1938 | Berry | ....................... | C10B 1/04 201/6 |
| 2,289,917 A * | 7/1942 | Lambiotte | ............... | C10B 49/04 201/34 |
| 2,397,432 A * | 3/1946 | Records | .................. | C10B 49/06 196/119 |
| 2,448,223 A * | 8/1948 | Lantz | ........................ | C10B 1/04 201/27 |
| 2,537,153 A * | 1/1951 | Nelson | .................... | C10B 49/10 201/27 |

(Continued)

*Primary Examiner* — Jonathan Luke Pilcher
(74) *Attorney, Agent, or Firm* — Orrick, Herrington & Sutcliffe LLP

(57) ABSTRACT

The disclosure provides several pyrolysis reactor configurations and associated methods for generating pyrolysis products (e.g., oil, gas, and/or char) from organic feedstock.

22 Claims, 12 Drawing Sheets

(56) References Cited

U.S. PATENT DOCUMENTS

| | | | | |
|---|---|---|---|---|
| 3,776,150 A | * | 12/1973 | Evans | B01J 8/002 |
| | | | | 110/245 |
| 3,843,457 A | * | 10/1974 | Grannen et al. | B09B 3/00 |
| | | | | 201/19 |
| 4,029,550 A | * | 6/1977 | Mitsui | B29B 17/04 |
| | | | | 201/2.5 |
| 4,031,192 A | * | 6/1977 | Hafeli | C01B 7/01 |
| | | | | 422/169 |
| 4,115,202 A | * | 9/1978 | Lorenz | C10B 1/04 |
| | | | | 201/15 |
| 4,225,392 A | * | 9/1980 | Taylor | C10B 1/04 |
| | | | | 202/120 |
| 4,435,374 A | * | 3/1984 | Helm, Jr. | B01J 19/126 |
| | | | | 204/157.43 |
| 5,584,970 A | * | 12/1996 | Schmalfeld | C10B 53/02 |
| | | | | 201/27 |
| 7,802,528 B2 | * | 9/2010 | Shuman | C10B 47/20 |
| | | | | 110/109 |
| 2007/0102279 A1 | * | 5/2007 | Novak | A62D 3/178 |
| | | | | 204/157.6 |
| 2009/0293783 A1 | * | 12/2009 | Shuman | C10B 47/20 |
| | | | | 110/255 |
| 2013/0195726 A1 | * | 8/2013 | Norton | H05B 6/78 |
| | | | | 422/119 |

* cited by examiner

PYROLYSIS REACTOR

FIELD OF THE INVENTION

The present application discloses systems and methods for conducting a pyrolysis reaction, wherein biomass or other suitable materials are converted to pyrolysis oil, pyrolysis gas, and other products.

BACKGROUND OF THE INVENTION

The pervasive use of fossil fuels as the primary energy source for most transportation, space heating and industrial activity has led to the release of increasingly large of amounts of carbon dioxide ($CO_2$) into the atmosphere. The resulting increase in $CO_2$ concentration in the atmosphere is believed by the climate research community to be a primary driver of global warming. Because of the potentially dire economic and human consequences of global warming, extensive efforts are being made to reduce all Green House Gas Emissions including $CO_2$ and $CH_4$ from dump sites and landfills wherever possible.

In view of the large fraction of the global economy that runs on gas and liquid hydrocarbon fuels (currently derived almost exclusively from fossil fuels), alternative fuels that can serve as replacements with a minimum of technological adjustment are desirable. Additionally, there is substantial demand for other fossil fuel-based feedstocks from the chemical industry. Therefore, there is a need for gas and liquid fuels, as well as other chemical feedstocks, the production and/or use of which results in reduced $CO_2$ emissions as compared to use of the fossil fuel equivalents. Carbon dioxide emissions from fossil fuel can be reduced by using pyrolysis of biomass and other waste streams to produce alternative fuels and feedstocks.

The world generated 1.4 trillion tonnes of municipal solid waste (MSW) in 2014. Of that total, 43% was landfilled, 9% was disposed in dump sites, 16% was incinerated, 9% was composted, and only 17% is recycled (What a Waste: A Global Review of Solid Waste Management, World Bank). The percentage of waste sent to the landfill and dumped could be reduced to less than 26%, using integrated materials and energy recovery. Mixed MSW may be sorted with the use of mechanical and optical technologies to extract (i) recyclables (plastic bottles, cardboard, paper, metals and glass/ceramics) and (ii) wet organic waste (food and yard waste) for anaerobic digestion to produce bio-gas, and (iii) compost and residual mixed unrecyclable waste (film plastics, plastic cups/plates, dirty unrecyclable paper/cardboard, diapers, and wood chips) for pyrolysis to produce biofuels.

MSW is not the only source of biomass for biofuel production. Materials such as wood wastes from forestry operations, crop residues from agriculture, and animal wastes may be used. Because biomass of these types ultimately are derived from photosynthesis, combustion of its derivatives does not add new $CO_2$ to the atmosphere, thereby resulting in a concomitant reduction in $CO_2$ emissions.

Pyrolysis is one of a number of processes that can be used to convert biomass and other sources of hydrocarbon-containing materials into gas and liquid fuels and other chemical feedstocks. Pyrolysis is a chemical process whereby hydrocarbon-containing materials can be thermally decomposed in the absence of free oxygen, and whereby useful hydrocarbon liquids, gases and other materials are produced as a result of that thermal decomposition from the biomass or other starting material. The products of pyrolysis can be further processed to produce gas and liquid fuels and other feedstocks required by the chemical industry.

While the chemical principles of pyrolysis have been well understood for several decades, it has only recently been applied to large-scale conversion of biomass and other hydrocarbon-containing waste streams. While many types of reactors are used for conducting pyrolysis, there is a need to provide a pyrolysis reactor with more efficient feedstock conversion in pyrolysis. One of the biggest challenges for commercial-scale pyrolysis is the reliability of continuous processing. Maintaining an oxygen free environment is critical to pyrolysis and has been very difficult to achieve. In one embodiment, the present invention provides a batch reactor that functions in a semi-continuous mode and provides sufficient throughput per reactor volume to satisfy the commercial scale requirement.

SUMMARY OF THE INVENTION

The invention provides an improved pyrolysis reactor and methods for using and configuring the same. The pyrolysis reactor generally consists of an upper pressure vessel and a lower reaction chamber. The pyrolysis reaction occurs in the upper pressure vessel, lower reaction chamber, or both using the organic feedstock contained therein. In one embodiment, a heating gas is introduced into the upper pressure vessel, lower reaction chamber, or both by way of gas inlets. The heating gas may be the process gas, or a combustion product thereof, that is produced by the pyrolysis reactor itself. Other suitable heating gases include, for example, natural gas (e.g., methane).

In another embodiment, the lower reaction chamber further comprises a gas-permeable distribution screen that divides the chamber into a centrally-disposed plenum and a laterally-disposed gas distribution space, wherein the distribution screen is adapted to retain a feedstock within the plenum. The plenum is contiguous with, or in communication with the upper pressure vessel. The lower reaction chamber may have the same outer dimension as the upper pressure vessel or have a smaller outer dimension. For lower reaction chambers with a smaller dimension, the upper pressure vessel may be tapered. In one embodiment the upper pressure vessel, the lower reaction chamber, and/or the plenum is cylindrical.

The lower reaction chamber further comprises one or more (e.g., one, two, three, four, five, or more) process gas inlets in communication with the gas distribution space. Process gas released into the gas distribution space permeates the gas distribution screen and heats the feedstock contained therein before passing through the upper pressure vessel and exiting through the gas outlet. Optionally, the gas distribution space further comprises one or more (e.g., one, two, three, four, five, or more) baffles. The baffles may be solid or comprise gas-permeable holes and may extend for the entire vertical length of the gas distribution space (i.e., from top to bottom) or only partially (e.g., about 25%, 50%, or 75% of the height). In one embodiment, the baffles contact or are affixed to the interior side of the outer wall of the lower reaction chamber. The baffles may extend across the entire width of the gas distribution space and contact the gas distribution screen or they may extend only across a portion of the width (e.g., about 25%, 50%, or 75% of the width).

In another embodiment, the pyrolysis reactor further comprises one or more (e.g., one, two, three, four, five, six, seven, eight, or more) microwave sources configured to heat the feedstock contained within the upper pressure vessel, lower reaction chamber, plenum, or any combination thereof. The microwave source(s) may be affixed to the interior wall of the reactor. The emitting aspect of each microwave source may be covered with a quartz window. Optionally, for microwave sources configured to heat feedstock in the plenum, the gas distribution screen comprises a material that is transparent or semi-transparent to microwaves. Optionally, the reactor further comprises cleaning nozzles directed at the emitting aspect of each microwave source and/or the quartz window covering. The cleaning nozzles are adapted to direct a cleaning gas or liquid onto the emitting aspect or quartz window.

In another embodiment, the lower reaction chamber and/or the plenum is in communication with a mass transport apparatus via an airlock. Optionally, the airlock forms a substantially airtight seal between the reactor interior and the atmosphere. The mass transport apparatus is adapted to receive char and/or unreacted feedstock from the reactor and transport it away from the reactor for storage or disposal. Suitable airlocks include, but are not limited to a rotary valve, a cooperative pair of rotary valves, a knife valve, a double knife valve, and double or triple flipgate valves.

In another embodiment, the upper pressure vessel is in communication with a feedstock supply line or feedstock hopper via an airlock. Optionally, the airlock forms a substantially airtight seal between the reactor interior and the atmosphere. Suitable airlocks include, but are not limited to a rotary valve, a cooperative pair of rotary valves, a knife valve, a double knife valve, and double or triple flipgate valves.

In another embodiment, the upper pressure vessel further comprises one or more (e.g., one, two, three, four, five, or more) process gas inlets. Optionally, one or more of the gas inlets is operably linked to a sensor configured to sense a condition in the upper pressure vessel. Conditions include, but are not limited to, temperature, gas flow rate, and gas flow velocity.

In another embodiment, the upper pressure vessel, the lower reaction chamber, the plenum, or any combination thereof further comprises a stirring device. Stirring devices include, but are not limited to, rotary paddles, augurs, and gas inlet jets. Gas inlet jets ("stirring jets") may be positioned on the outer wall and direct gas toward the central axis, or any central point of the chamber, or they may be directed along a chord or in a direction other than at the central point. In one embodiment, the reactor contains a plurality of stirring jets (e.g., 2, 3, 4, 5, 6, 7, 8, 9, 10, 15, 20, or more). The stirring jets may be configured to inject gas at the same or a higher flow rate than the process gas inlets. The stirring devices, including the stirring jets, may be configured to operate continuously or intermittently. Intermittent actuation may be manual (i.e., user-operated) or automatic. Automatic operation may be linked to a timer such that the stirring devices are actuated on a pre-determined schedule at regular or irregular intervals. Alternative, the stirring devices may be operable linked to one or more sensors including, for example, sensors of temperature and gas flow rate.

Any organic feedstock is suitable for use in the pyrolysis reactor and the pyrolysis reaction described herein. Particularly useful feedstocks include automobile tires. Other useful feedstocks include, for example, paper, paper products, wood, wood and paper pulp, cardboard, food and agricultural residue (e.g., clippings, stalks, and municipal yard waste), and plastics including those recycled from the MSW stream.

DETAILED DESCRIPTION OF THE INVENTION

Figure 1:
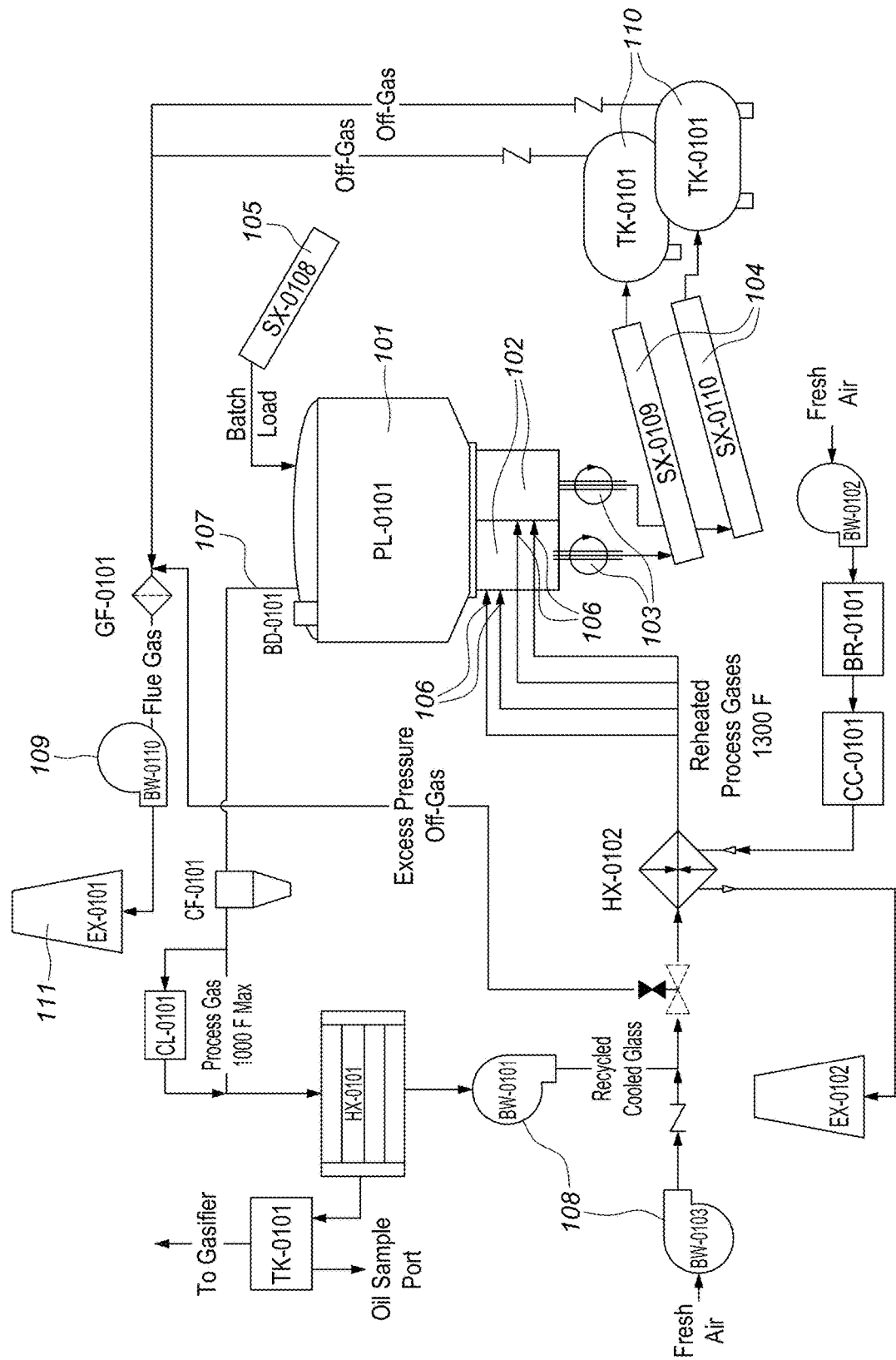
FIG. 1 illustrates a simplified exemplary pyrolysis apparatus according to one embodiment of the present invention.

An apparatus for conducting pyrolysis reactions to generate pyrolysis products from feedstock is disclosed. According to one embodiment, the apparatus includes an upper pressure vessel and a lower reactor chamber. Pyrolysis reactions occurring within the apparatus are facilitated by the use of process heating gas that is driven into the lower reactor chamber. After passing into the lower reactor chamber from one or more gas inlets, the process heating gas passes through a distribution screen within the lower reactor chamber. The thermal energy carried by the process heating gas is transferred to the feedstock contained within the apparatus, thereby facilitating pyrolysis and the eventual production of useful hydrocarbon-containing products.

In the following description, for purposes of clarity and conciseness of the description, not all of the numerous components shown in the schematic are described. The numerous components are shown in the drawings to provide a person of ordinary skill in the art a thorough enabling disclosure of the present invention. The operation of many of the components would be understood to one skilled in the art.

Each of the additional features and teachings disclosed herein can be utilized separately or in conjunction with other features and teachings to provide the present reactor. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense and are instead taught merely to describe particularly representative examples of the present teachings.

Moreover, the various features of the representative examples and the dependent claims may be combined in ways that are not specifically and explicitly enumerated in order to provide additional useful embodiments of the present teachings. In addition, all features disclosed in the description and/or the claims are intended to be disclosed separately and independently from each other for the purpose of original disclosure, as well as for the purpose of restricting the claimed subject matter independent of the compositions of the features in the embodiments and/or the claims. All value ranges or indications of groups of entities disclose every possible intermediate value or intermediate entity for the purpose of original disclosure, as well as for the purpose of restricting the claimed subject matter. The dimensions and the shapes of the components shown in the figures are designed to help understand how the present teachings are practiced but are not intended to limit the dimensions and the shapes shown in the examples.

According to another embodiment, a pyrolysis reactor includes an upper pressure vessel and a lower reactor chamber. Within the lower reactor chamber is a gas-permeable distribution screen that forms a centrally-disposed plenum and a laterally-disposed gas distribution space, with the distribution screen adapted to retain a feedstock within the plenum and the plenum is contiguous with the upper pressure vessel, and a process gas inlet is in communication with the gas distribution space.

I. Pyrolysis Reactor

FIG. 1 depicts an embodiment of a simplified exemplary pyrolysis apparatus. The upper pressure vessel 101 is located over one or more lower reaction chambers 102. Each lower reaction chamber 102 has at least one gas inlet 106. Additionally, upper pressure vessel 101 has a gas outlet 107. Disposed above the upper pressure vessel is feedstock input 105, and disposed below each lower reaction chamber is an airlock 103, depicted in FIG. 1 as a rotary valve. The airlock is disposed above augur 104. In some embodiments, the upper pressure vessel 101 and/or lower reaction chamber 102 further comprises a partial or full layer of insulation to minimize heat loss during the pyrolysis reaction. Optionally, the process gas inlet lines and outlet lines also are insulated.

Various additional common elements are used to implement this pyrolysis apparatus. Examples of these elements include blowers 108 that drive the flow of gases into the lower reaction chamber; blowers 109 that drive off-gases generated at various points in the system; storage tank 110 for char emptied from the lower reaction chamber 102 by augur 104; and exhaust stack 111 that vents off gases from the storage tank for char.

A. Upper Pressure Vessel

Figure 2:
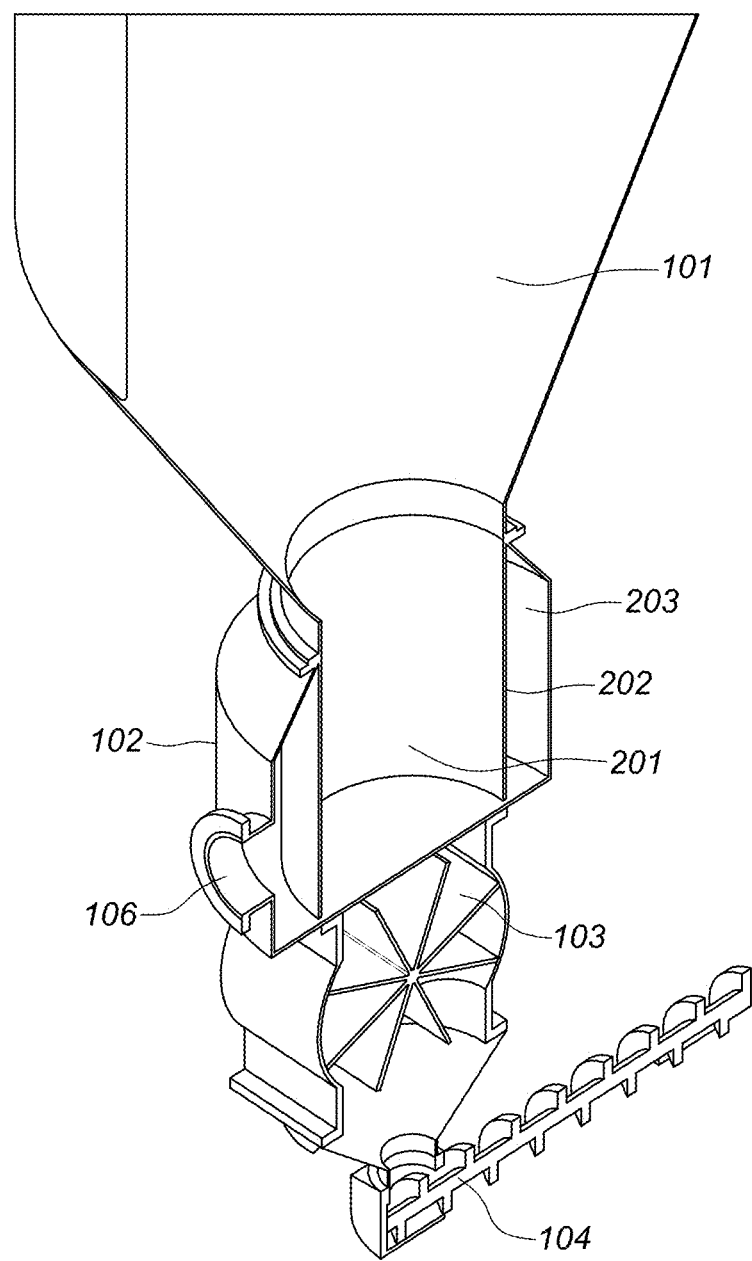
FIG. 2 illustrates a cutaway view of the upper pressure vessel, lower reaction chamber, airlock and augur, according to another embodiment of the present invention.

As depicted in FIGS. 1 and 2, except for inlets and outlets for process heating gas, together the upper pressure vessel 101 and lower reaction chamber 102 provide a single space that is sealed from the outside environment during operation. This seal prevents oxygen (air) from entering the volume enclosed by the upper pressure vessel 101 and lower reaction chamber 102, thereby facilitating pyrolysis, which process requires an oxygen-free environment. As shown in FIG. 1, the upper pressure vessel 101 may communicate with a plurality of lower reaction chambers 102. The upper pressure vessel 101 has a feedstock input 105. Optionally, the feedstock input 105 also may include an airlock similar to the rotary valve 103 depicted in FIG. 1 for periodic incremental filling. The feedstock input may be an augur, a conveyor belt or other transport apparatus that is suitable to move the feedstock chosen by a user to a position above the upper pressure vessel 101. The airlock may use one or more rotary valves, knife valves (e.g., a double knife valve) or other apparatus that is suitable to move the feedstock from above the upper pressure vessel 101 into its interior while minimizing the amount of air that is permitted to enter the upper pressure vessel 101. In some embodiments, the upper pressure vessel further comprises process gas inlets. Additionally, the upper pressure vessel 101 may have microwave apparatus for heating of feedstock contained therein, and it also may have temperature monitoring apparatus.

The upper pressure vessel may have any convenient size, shape, and dimension to accommodate the desired amount of feedstock. Cylindrical upper pressure vessels are generally preferred because it minimizes the outer surface area to volume ratio, thereby minimizing radiant heat loss during pyrolysis while facilitating more uniform heat transfer within the feedstock. Likewise, the upper pressure vessel may have any relative dimension, however, it is preferred that the ratio of the height to width/diameter be about 1:1, 1:2, 1:3, 1:4, 1:5, or less.

B. Lower Reaction Chamber

As depicted in FIG. 2, the top of lower reaction chamber 102 is open to the upper pressure vessel 101 and so feedstock that is present in the upper pressure vessel 101 can be gravity fed into the lower reaction chamber 102. The lower reaction vessel may have any relative dimension, however, it is preferred that the ratio of the height to width/diameter be about 1:1, 1:2, 1:3, 1:4, 1:5, or less.

Figure 4:
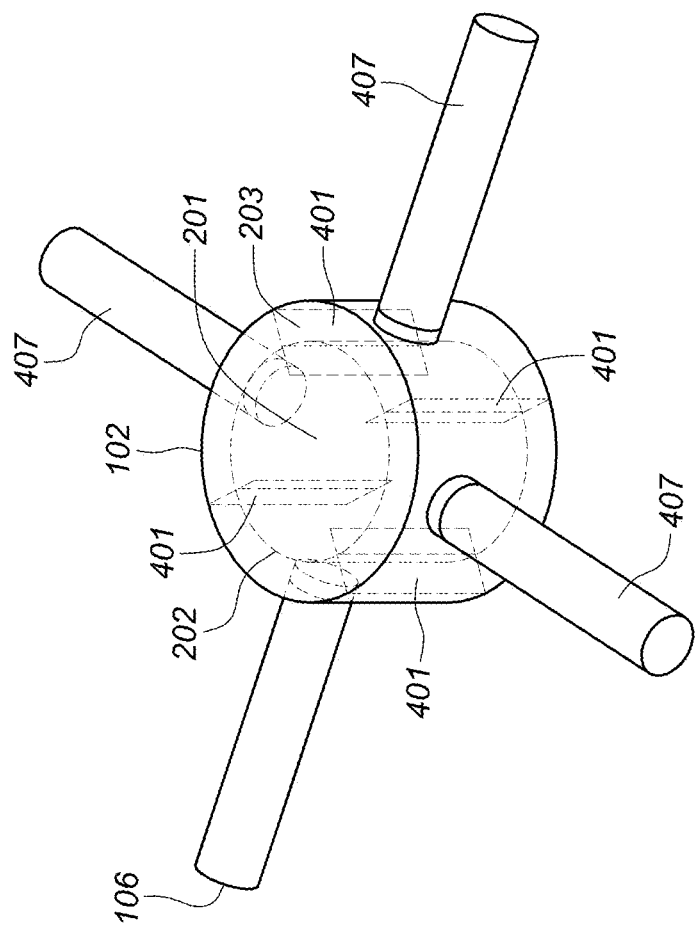
FIG. 4 illustrates a top view of a lower reaction chamber that includes baffles, according to another embodiment of the present invention.
Figure 4:
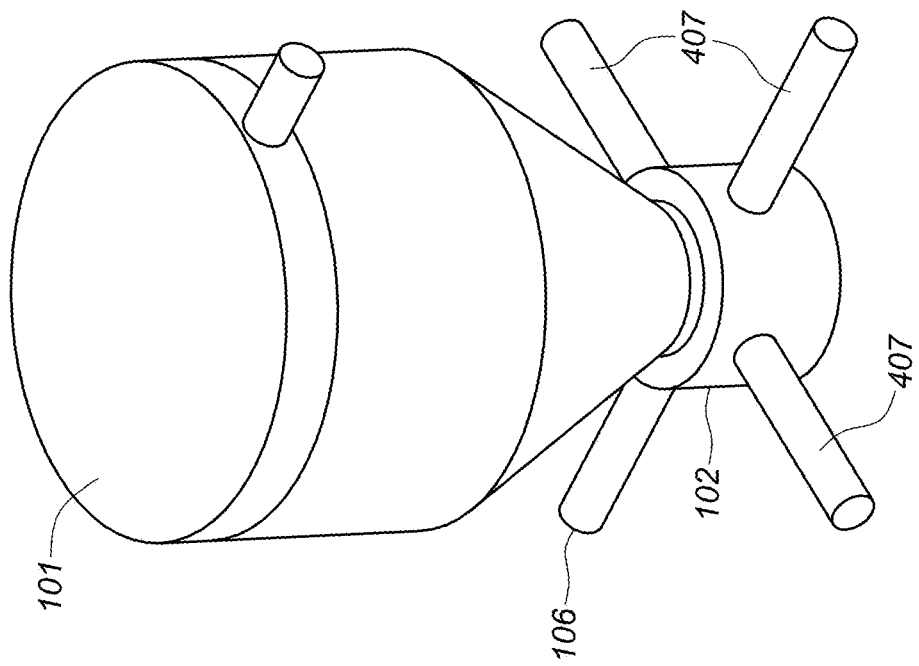

The lower reaction chamber 102 also has a distribution screen 202 which forms a plenum 201 that is contained within the lower reaction chamber 102. The lower reaction chamber 102 also has one or more gas inlets 106 (compare FIGS. 1 and 2), FIG. 4 depicts optional also gas outlets 407; additionally, when desired the lower reaction chamber 102 may also use baffles 401 to modify the flow of process heating gas. The lower reaction chamber 102 may have microwave apparatus to aid in heating feedstock.

FIG. 2 also depicts that lower reaction chamber 102 is disposed over an airlock 103; the airlock 103 can facilitate the movement of char from the lower reaction chamber 102 to the augur 104 disposed below. The airlock 103 may use one or more rotary valves, knife valves or other apparatus that is suitable to move the char from within the lower reaction chamber 102 into the augur 103 disposed below while minimizing the amount of air that is permitted to enter the lower reaction chamber 102.

C. Distribution Screen

As depicted in each of FIGS. 2-5, the distribution screen 202 is located within the lower reaction chamber 102 and divides that chamber in a centrally-disposed plenum and the laterally- or outwardly-disposed gas distribution space. A variety of corrosion-resistant materials may be used to fabricate distribution screens 202. A wide variety of metals and/or alloys that are commonly used to construct internal parts in pyrolysis reactors are suitable for use. For example, a distribution screen 202 may be fabricated from the same metal from which the reactor is made. Suitable materials include, for example, steel, stainless steel, steel alloys, cast iron, and aluminum.

Alternatively, where the lower reaction chamber 102 has microwave apparatus included for heating of feedstock (see FIG. 5), the distribution screen 202 may be fabricated of materials with low dielectric constants which do not absorb microwave radiation. Distribution screens 202 may be fabricated from heterogeneous material (e.g. laminated or coated), or their surfaces may be intentionally irregular (e.g., etched or otherwise having substantial surface relief with repeating or random patterns). Suitable materials include, for example, ceramic.

Additionally, a distribution screen 202 has a number of holes, so as to allow the flow of gas with minimum of flow resistance, but promoting the even distribution of the flow, to prevent uneven heating of the feedstock within the lower reaction chamber. A person of skill in the art would know how to select the proper materials, hole geometry and other aspects of fabrication of distribution screens 202. See, e.g., L. F. Chen, et. al., *Microwave Electronics: Measurement and Materials Characterization*, 2004.

D. Plenum and Gas Distribution Space

Figure 5:
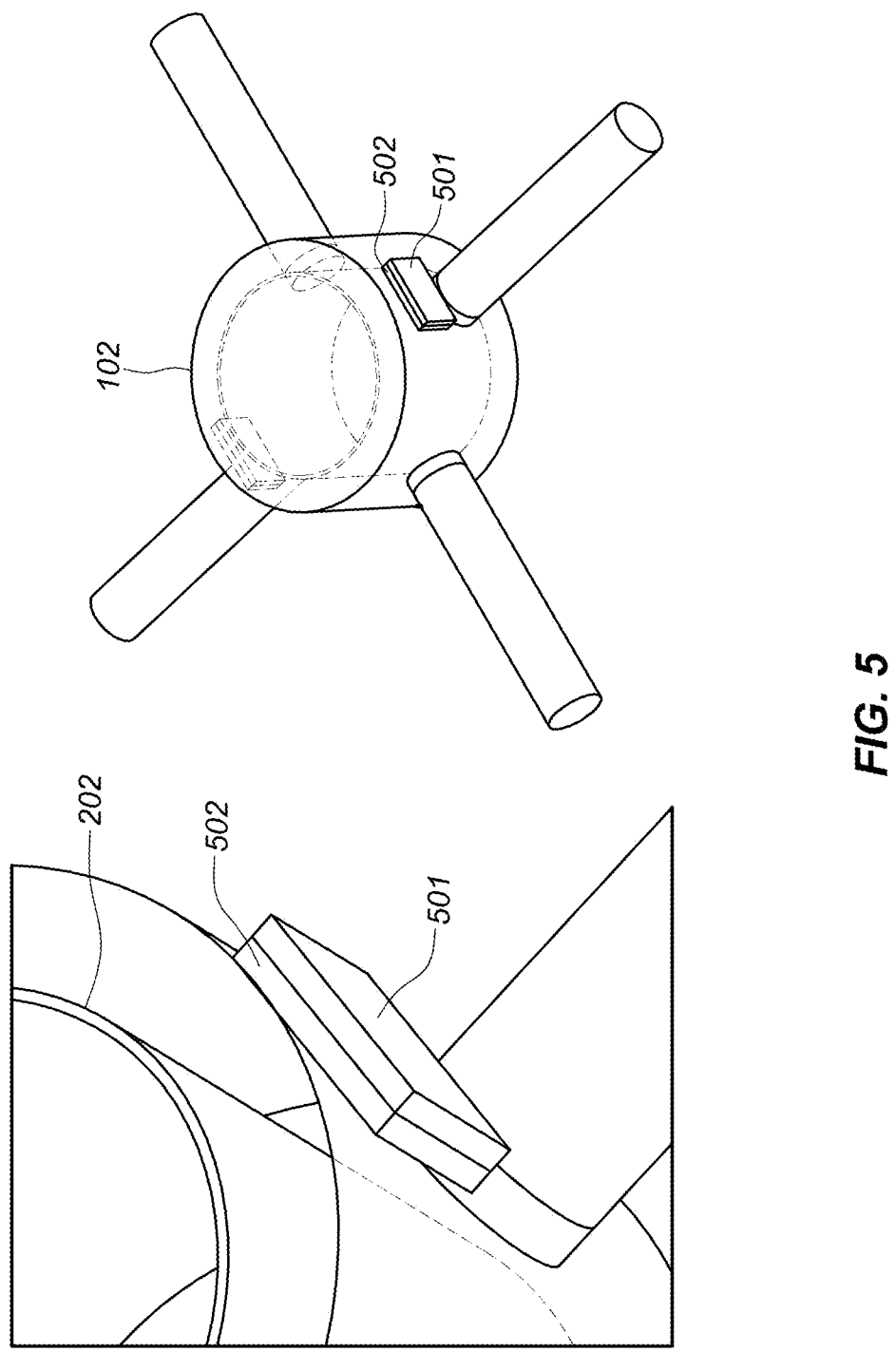
FIG. 5 illustrates the placement of a microwave waveguide within a lower reactor chamber, according to another embodiment of the present invention.

As depicted in each of FIGS. 2, 4 and 5, both the plenum 201 and the gas distribution space 203 are volumes that, when taken together, account for substantially all of the volume within the lower reactor chamber 102. The distribution screen 202 divides the lower reaction chamber 102 into an inner plenum 201 that is contiguous with the upper pressure vessel, and an outer gas distribution space. The plenum 201 may be any appropriate shape but is preferably the same shape (but not necessarily the same dimension) as the upper pressure vessel 101 and/or the lower reaction chamber 102. In one embodiment, each of the upper pressure vessel 101, lower reaction chamber 102, and plenum 201 is cylindrical. Typically, the diameter of the upper pressure vessel 101 is larger than that of the lower reaction chamber 102, which itself is larger than that of the plenum. In one embodiment, the plenum is tapered with the larger end of the taper open to the upper pressure vessel 101. For example, if the plenum is generally cylindrical, it would take an inverted frustoconical form. The taper advantageously facilitates the packing of char (i.e., reducing dead space) as the volume of feedstock is reduced during pyrolysis and is more conducive to its interconnection with a char removal system. The gas distribution space 203 occupies the volume outside of the distribution screen 202 but within the lower reactor chamber 102, whereas, the plenum 201 occupies the volume inside the distribution screen 202. Further, as depicted in FIG. 2, the bottom of the gas distribution space 203 may be located at the floor of the lower reactor chamber 102, whereas the bottom of the plenum may extend into sections of the airlock (here a rotary valve) as are open to the plenum. Conversely, the top of the gas distribution space 203 may be located at the joint between the top of the lower reactor chamber 102 and the top of the distribution screen 202. The top of the plenum 201 may be formed by the plane that would define the top of the cylindrical shape that is formed by the distribution screen 202. This configuration provides for a division of the lower reactor chamber 102 into two distinct volumes, one that is located entirely within the diameter of the distribution screen 202, and the other that is located between the distribution screen 202 and the walls of the lower reactor chamber 102.

Optionally, the process gas feed inlets are located, and terminate within the gas distribution space 203. This concentric arrangement allows the apparatus to contain feedstock within the plenum 201, while the gas distribution space 203 remains clear for smooth and efficient flow of process heating gas. The process gas flows around the exterior of the plenum 201 and penetrates the plenum 201 and feedstock containing therein to heat the feedstock and facilitate the pyrolysis reaction. The process gas is forced through the feedstock contained within the plenum and lower reaction chamber, and eventually through the upper reaction chamber before exiting the reaction vessel through the process gas outlet. Additionally, when the plenum 201 is emptied, new feedstock falls into the plenum 201 to replace the char that is removed; the char is also removed by gravity as the airlock 103 operates. Because this movement of char and feedstock occurs within the plenum 201, it creates no obstructions to the smooth and efficient flow that is characteristic of the gas distribution space 203.

E. Microwave Apparatus

Figure 6:
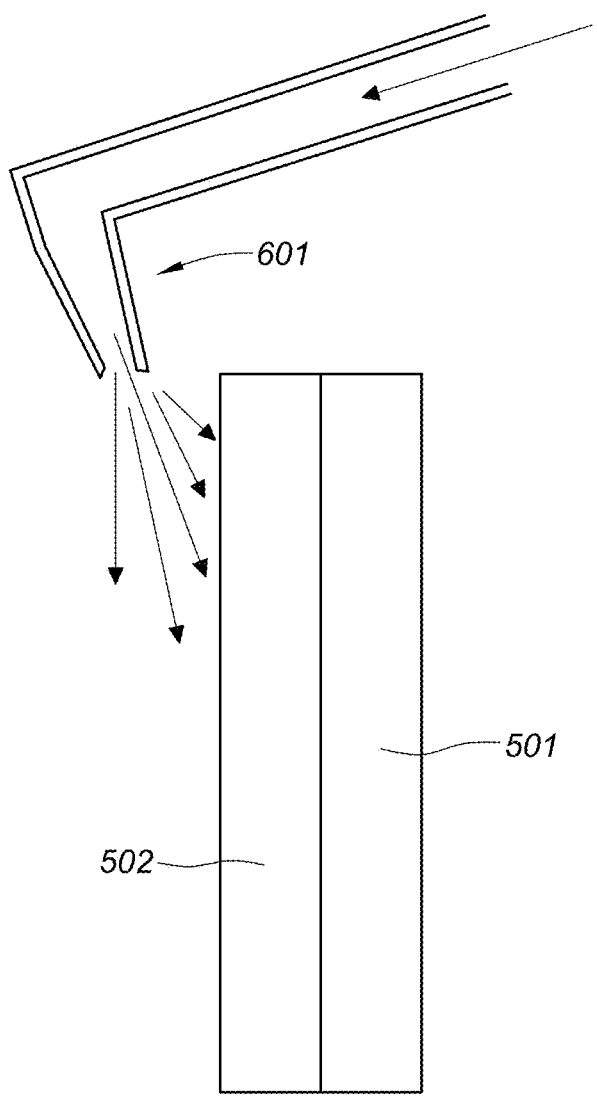
FIG. 6 illustrates an apparatus for cleaning a quartz window covering a microwave waveguide, according to another embodiment of the present invention.

FIGS. 5 and 6 depict microwave apparatus that may facilitate heating of feedstock. Such heating can further increase the efficiency of pyrolysis because heating of materials by means of microwave absorption is often more energy-efficient than by convection from process heating gas. In one embodiment, the feedstock contained within the plenum is heated solely by the microwave apparatus. In another embodiment, the feedstock is heated by a combination of microwaves and a hot process gas according to the other embodiments described herein. Significant advantages are realized when feedstock heating is effected using the combination of microwaves and process gas. Microwave heating of the feedstock is often uneven throughout the bulk of the feedstock. The materials present in mixed feedstocks may be heated at different rates, leading to "hot spots" and "cold spots" within the bulk. Additionally, dead space (e.g., air spaces) within the feedstock mass are not efficiently heated by microwave radiation. The process gas serves as a heat transfer medium within the bulk feedstock.

The microwave apparatus as depicted in FIG. 5 uses a microwave waveguide 501 to direct microwaves into the lower reaction chamber 102. While not depicted, a microwave apparatus may be included in an upper pressure vessel 101 and/or a mass transport apparatus when used to load feedstock into an upper pressure vessel 101. Such uses will allow for microwave pre-heating of the feedstock and improved efficiency of pyrolysis.

The optimal number and location of waveguides 501 can be determined for the specific lower reaction chamber 102 and a desired processing rate. To prevent interference with the microwave radiation, the distribution screen 202 is made of material with low dielectric constants and does not absorb microwave radiation such as Alumina or other noncorrosive material with the required structural and thermal properties. In addition to preventing feedstock from blocking the process heating gas inlets, and providing a plenum for flow distribution, the other important function of the distribution screen 202 is to prevent solids from reaching the quartz windows 502. If particles with microwave absorptivity characteristics stick to the quartz windows 502, they act as a catalyst for overheating and may crack the quartz windows 502.

To enhance availability and reliability with redundancy for operation in case of failure in the microwave system or the process gas heating system, a pyrolysis reactor constructed according to this disclosure may be operated in full microwave mode, partial microwave mode or full process gas heating mode. Heating rates may be varied with both systems as required providing a great level of processing rate flexibility.

A key design characteristic of the lower reaction chamber in the embodiments of this disclosure is the radial flow of process heating gas towards the center of the plenum. This minimizes solids particles entering the plenum and depositing on the quartz windows that shield the microwave waveguides. Because such solids particles may contribute to cracking quartz windows if deposited thereon, it is advantageous that the radial flow of process heating gas towards the center of the plenum substantially reduces the extent to which such deposits form.

The microwave apparatus depicted in FIG. 6 optionally may contain a nozzle 601 configured to prevent feedstock-derived particles circulating in the gas distribution space 203 from sticking to the quartz window 502. Such contamination of the surface of the quartz window 502 is undesired, as stray particles circulating in the gas distribution space may act as a catalyst for overheating and thereby cause cracking of the quartz window 502. The composition of the cleaning gas directed at the quartz window 502 by the nozzle 601 may be a gas of low reactivity such as nitrogen, argon, helium or other noble gases.

Microwave heating of feedstock is uneven, resulting in "hot spots" and "cold spots." Local feedstock temperature variations may result from differences in feedstock compositions, dead space volumes, and the spatial relationship with the microwave source (e.g., distance from and angle to the source). The process gas, in addition to providing a primary heat source, also may be used as a heat transfer agent. Permeation of the microwave-heated feedstock by the process gas serves to more efficiently transfer heat from the hot spots to the cold spots within the feedstock mass, thereby promoting more complete and efficient pyrolysis.

F. Process Gas Inlets and Stirring Devices

One of the challenges associated with fixed bed pyrolysis reactors is the channeling of reacting gases through the paths of least resistance. Periodic stirring or "turning over" of the feedstock promotes more even heating and more compact packing of the feedstock and resulting pyrolysis char, thereby allowing for greater reactor loading and a more efficient pyrolysis reaction by closing the gas channels that form within the feedstock bulk. Therefore, the upper pressure vessel and/or the lower reaction chamber further optionally may comprise a stirring or agitation device Stirring and moving a granular solids bed in a gas-solid sealed reactor is a very difficult task. Most known methods such as moving trays and other methods, where mechanical power is supplied externally through the reactor walls, pose reliability problems. Due to temperature, pressure and mechanical movement, the connection ports through the walls lose the integrity of the sealing mechanisms. This effects the operation and performance level of the reactor. In addition, the use of metallic stirring parts within the reactor is not possible in the microwave operating mode. The use of ceramic parts may be possible if the material and mechanical design meets the mechanical thermal stress requirements of mixing. In order to avoid moving parts that are driven through the walls for the pressure vessel and/or the reaction chamber by external motors, the use of direct gas stirring jets with an intelligent control system is recommended.

In one embodiment, the pyrolysis reactor comprises one or more (e.g., one, two, three, four, or more) process/heating gas inlets positioned in the gas distribution space for introducing the heating gas into the lower reaction chamber in order to heat the feedstock retained within the plenum. In another embodiment, the reactor further comprises one or more (e.g., one, two, three, four, or more) process/heating gas inlets positioned in the upper pressure vessel. Heating gas may be introduced directly into the upper pressure vessel in order to maintain a suitable temperature for pyrolysis in that that chamber and/or to preheat the feedstock before it falls into the plenum. Additionally, the introduction of gas into the upper pressure vessel can serve to stir or compact the feedstock in that vessel thereby closing voids and gas flow channels through which the heated process gas produced in the plenum or lower portions of the reactor may flow. The reduction of voids and gas flow channels promotes a more rapid and efficient pyrolysis reaction in the upper pressure vessel.

In one embodiment, the reactor comprises one or more (e.g., one, two, three, four, or more) gas inlets configured to stir the feedstock ("stirring jets"). The stirring jets may dispense a process or heating gas, or a different gas. The stirring gas may be dispensed at the same velocity, flow rate, and volume as the process or heating gas, or it may be dispensed in a higher velocity, flow rate, and/or volume.

The stirring jets may be operated continuously or intermittently. When operated intermittently, the stirring jets may be controlled manually or by a timer such that the heating gas is introduced into the upper pressure vessel at regular time intervals and/or in pre-determined quantities or for a pre-determined duration. Alternatively, the upper pressure vessel further may comprise a temperature senor operably linked to the stirring jets. The stirring jets may be opened when the upper pressure vessel temperature falls below a pre-determined value and the heating gas may be introduced either for a pre-determined period of time or until a pre-determined temperature is achieved. In another embodiment, the upper pressure vessel or process gas outlet line further comprises an optical, visual, or other sensor that detects the gas velocity or flow rate. High flow rates and velocities indicate the presence of voids or gas flow channels within the upper pressure vessel. These sensors, detecting a high flow rate, may activate the gas inlets to effect stirring and settling of the feedstock to reduce the flow channels.

The stirring jets may be oriented in any convenient manner to achieve the desired result. In one embodiment, the stirring jets are distributed at circumferential wall locations pointing towards the vertical axis of the reactor. Alternatively or in addition, stirring jets may be directed along a chord or other plane that does not pass through the center of the reactor chamber. Stirring jets also may be oriented out of the horizontal plane. The stirring jets may be fed from the same source of process heating gas as used to in the lower reaction chamber be fed from a separate source.

In one embodiment, the pyrolysis reaction comprises only a single set of gas inlets which act to heat the feedstock by dispensing a process gas in order to maintain a suitable pyrolysis temperature (e.g., operated continuously or operably linked to a temperature sensor) and to stir the feedstock during the pyrolysis reaction. Preferably, the same process gas is used to effect both heating and stirring. In one embodiment, the gas inlet is configured to deliver the process gas to the reactor at variable flow rates, wherein a lower flow rate is used for the maintenance of the reactor temperature and a higher flow rate is used when feedstock stirring is desired. For example, the gas inlet may release process gas at a continuous but low flow rate in order to maintain the reactor temperature in a desired range and intermittently deliver pulses of process gas at a high flow rate to cause feedstock stirring or settling. Alternatively, both processes (the heating process and the stirring process) may be separately controlled and intermittently applied.

Although less desirable than stirring jets, stirring also may be effected by stirring devices such as rotating paddles and augurs. These stirring devices, like the gas inlets, may be operated continuously or intermittently, and may be operably linked to one or more sensors.

Figure 7:
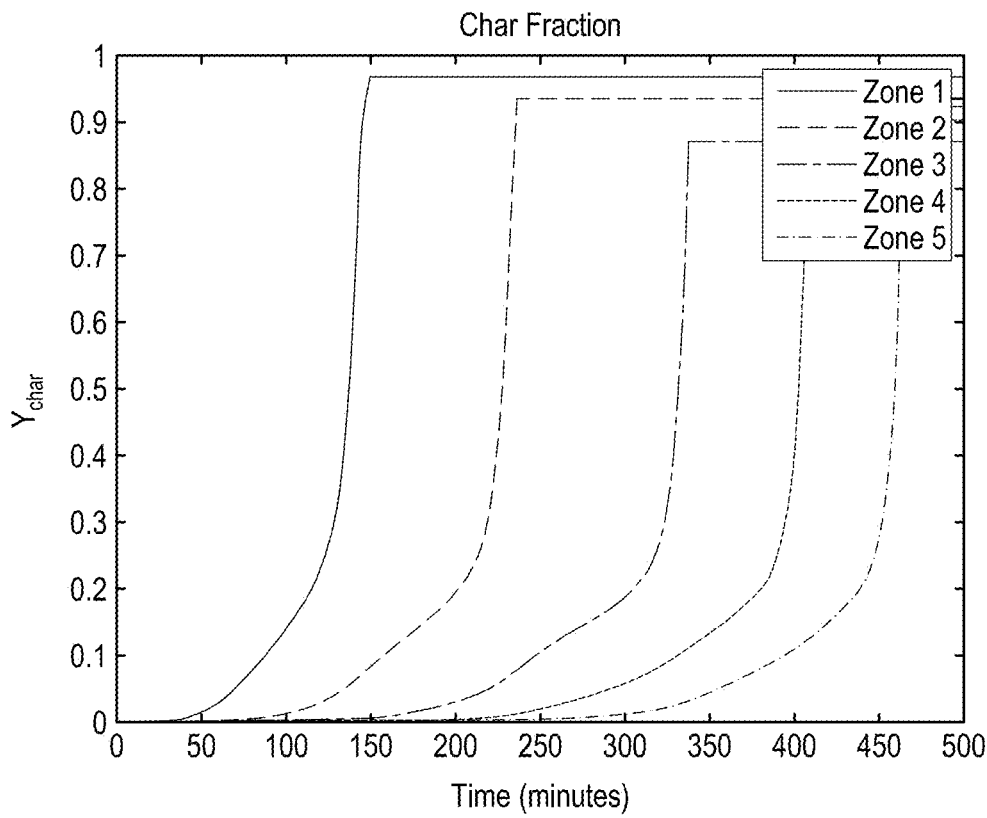
FIG. 7 provides profiles of bed conversion to char for the case of no bed movement FIG. 8 provides profiles of bed conversion to char for the case of bed settling only FIG. 9 provides profiles of bed conversion to char for the case of bed settling and removal FIG. 10 provides profiles of bed temperature for the case of no bed movement FIG. 11 provides profiles of bed temperature for the case of bed settling only FIG. 12 provides profiles of bed temperature for the case of bed settling and removal

The effect of stirring is illustrated by the calculations presented in FIGS. 7-12, wherein zone 1 is located at the bottom of the reactor (i.e., in the plenum) and the subsequent zones are located progressively higher in the reactor body. FIG. 7, illustrates the baseline case for the conversion of feedstock to char in a batch reactor when there is no movement of the feedstock/char bed during the pyrolysis reaction. Char formation begins quickly in the lower portion of the reactor that is closest to the heat source. Over time, the temperature increases in the upper reactor zones. Eventually, the temperature rises in each level to initiate the pyrolysis reaction and convert the feedstock to char. However, the conversion to char does not reach the same level of completion at the higher levels presumably because the final temperature is below the plenum temperature.

Figure 8:
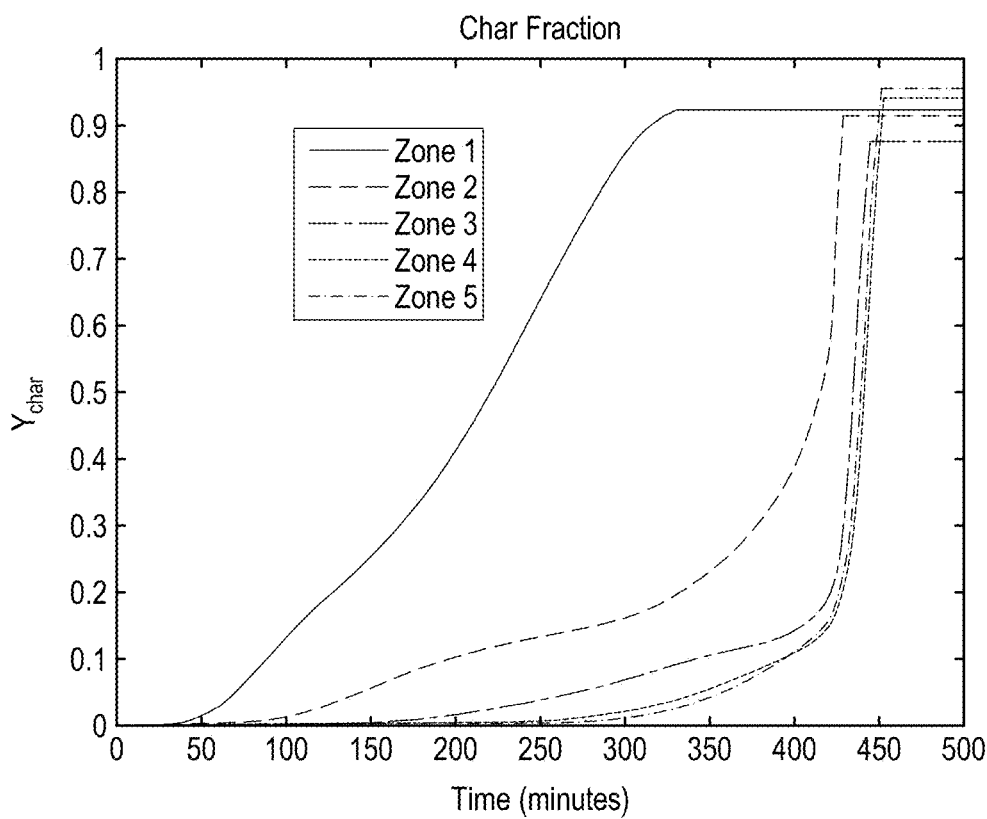

FIG. 8 illustrates the conversion of feedstock to char when the bed settles due to stirring or movement of the feedstock/char mass. As illustrated, the initiation of pyrolysis is delayed in the upper zones but the reaction is more complete for the upper level feedstock relative to the base case illustrated in FIG. 7.

Figure 9:
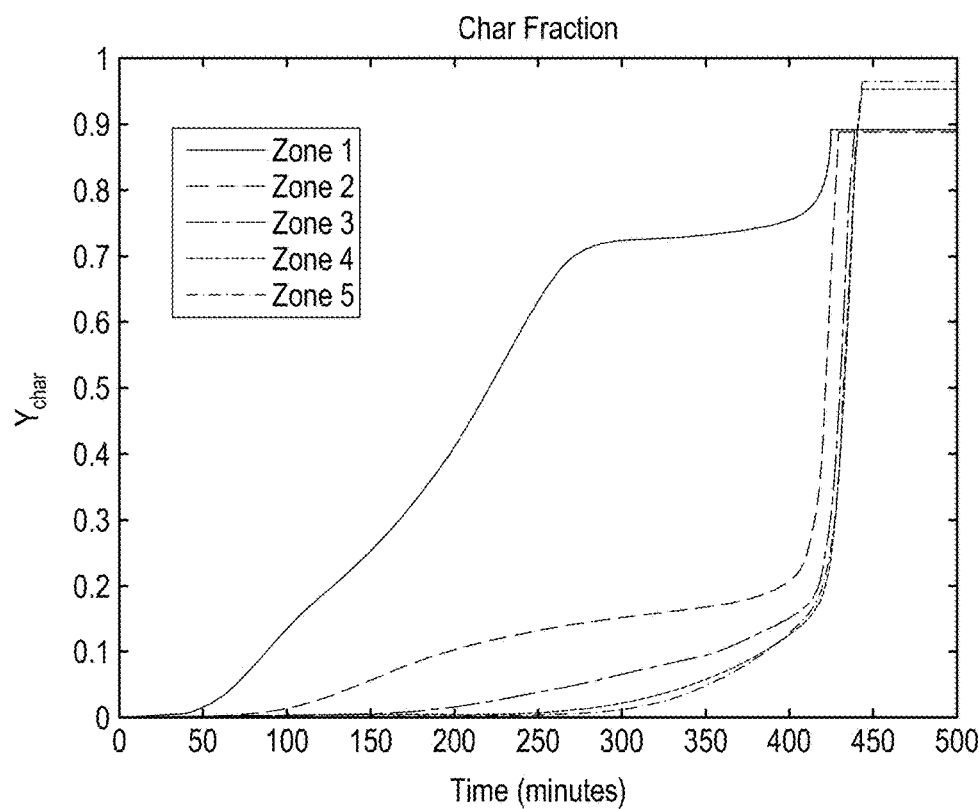

FIG. 9 illustrates the case for the conversion of feedstock to char when the char is removed from the bottom of the reactor and the bed, necessarily settles. Here again, initiation of pyrolysis reaction is delayed in some of the reactor zones relative to FIG. 7; however, the reaction is more complete for feedstock at the higher zones relative to the conditions set forth for FIGS. 7-8.

Figure 10:
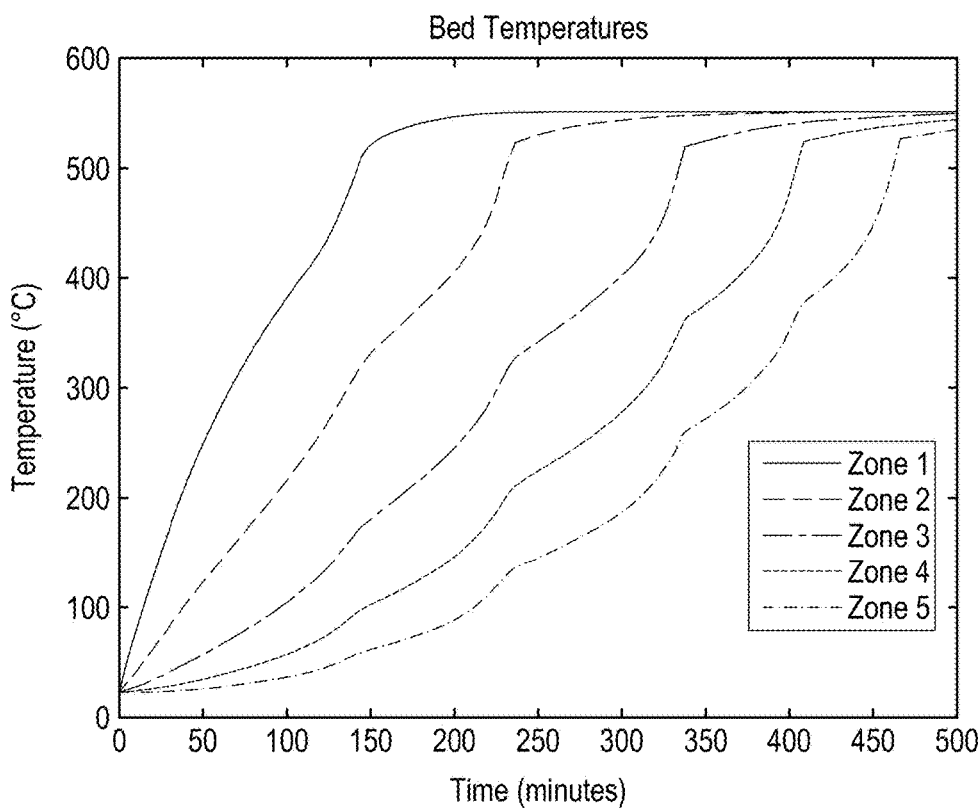
Figure 11:
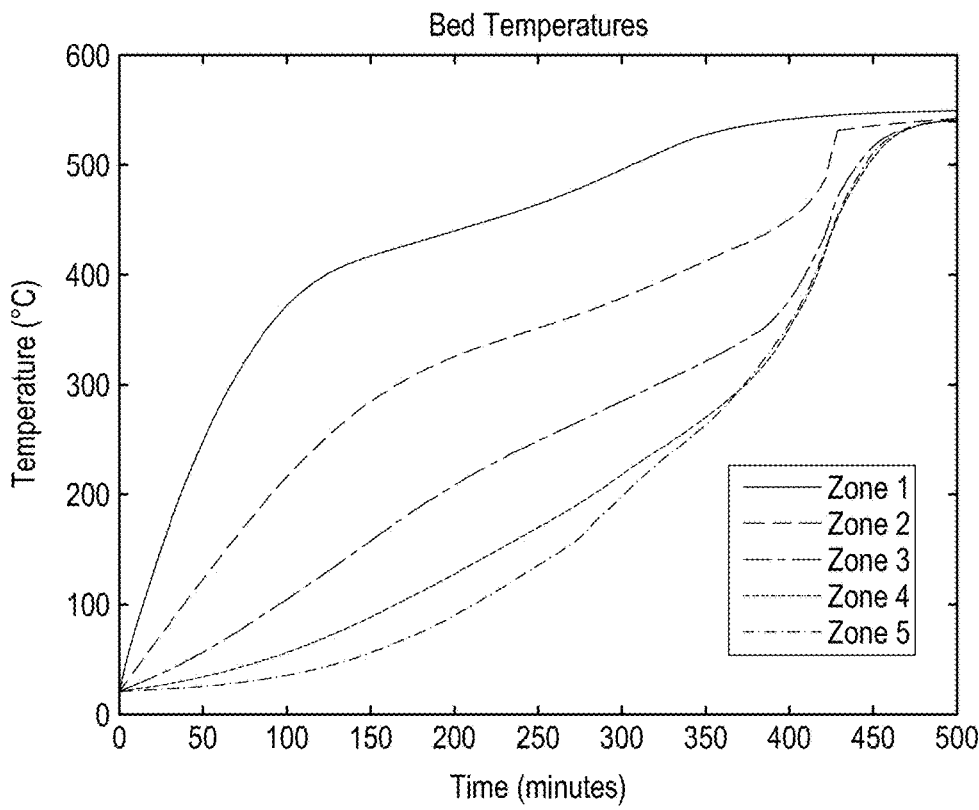
Figure 12:
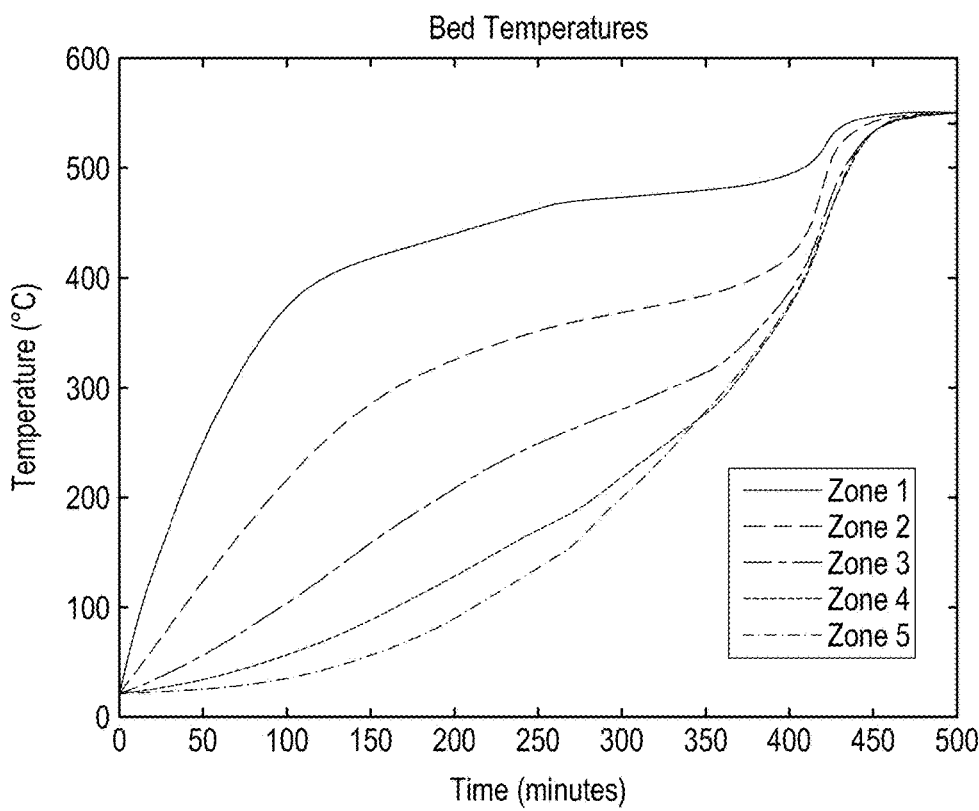
Figure 13:
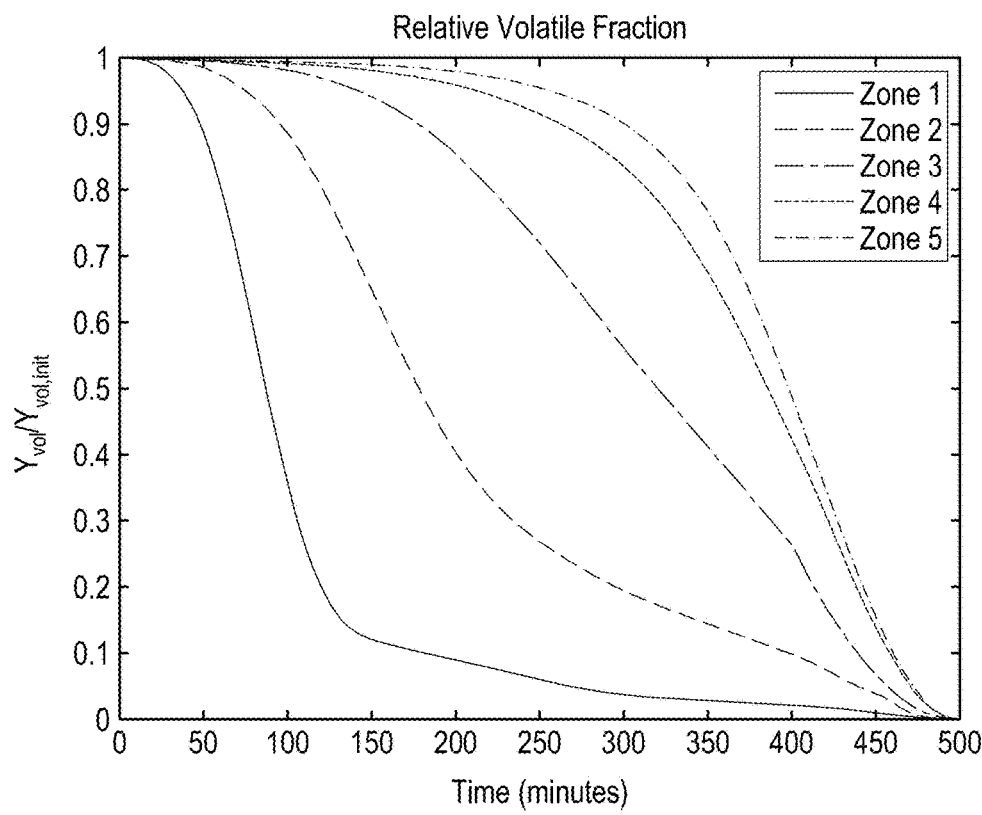
FIG. 13 illustrates volatile matter mass fraction as a function of temperature in the reactor
Figure 14:
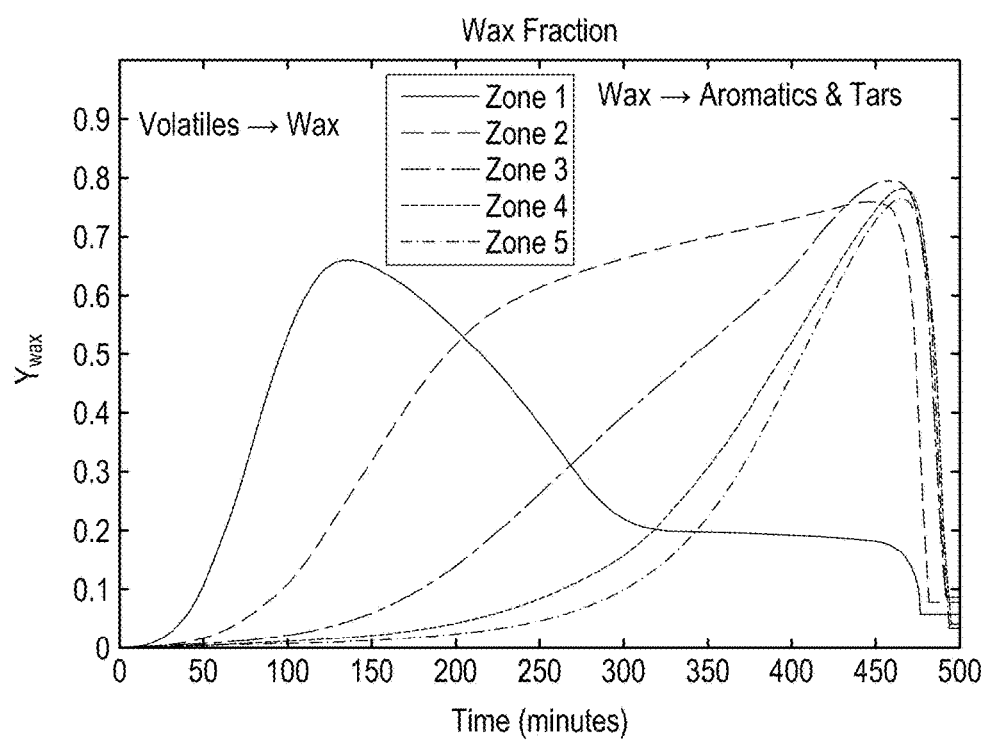
FIG. 14 illustrates wax mass fraction as a function of temperature in the reactor
Figure 15:
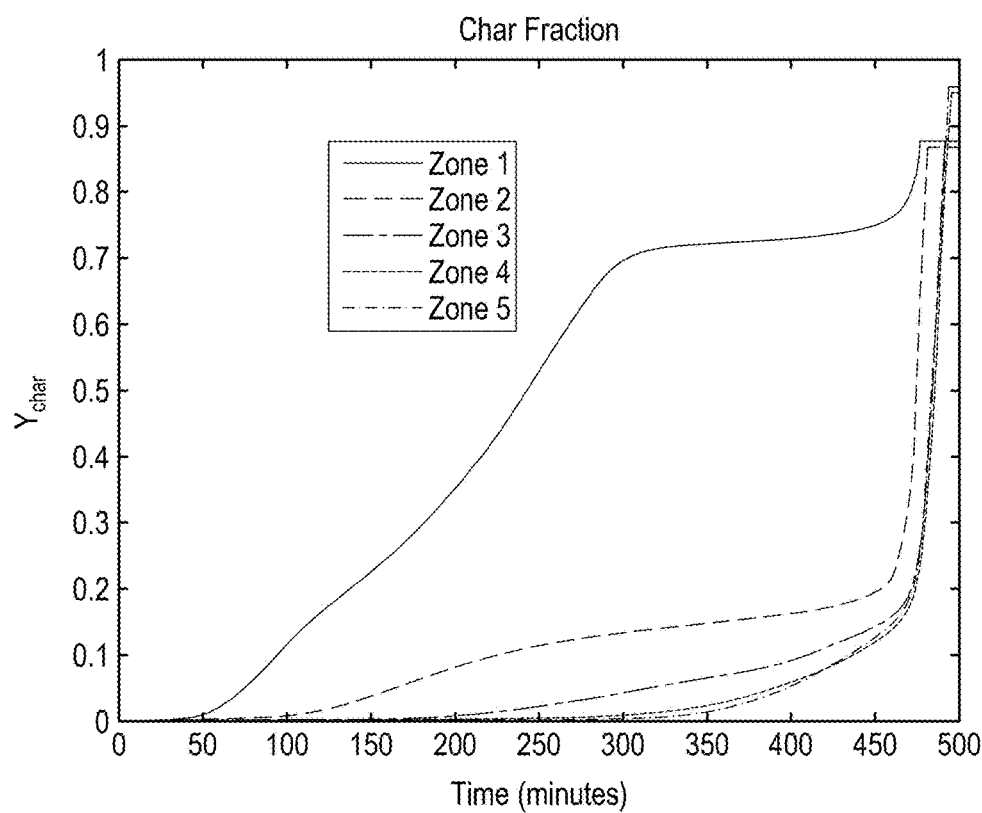
FIG. 15 illustrates char mass fraction as a function of temperature in the reactor
Figure 16:
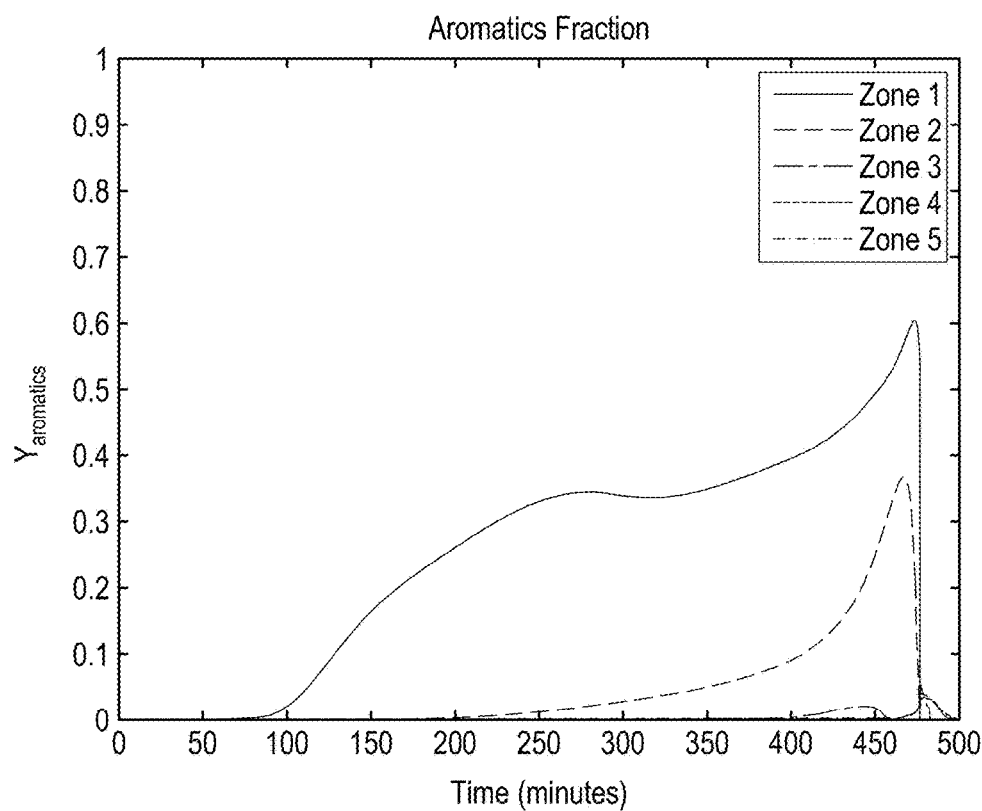
FIG. 16 illustrates aromatics mass fraction in pyrolysis gas
Figure 17:
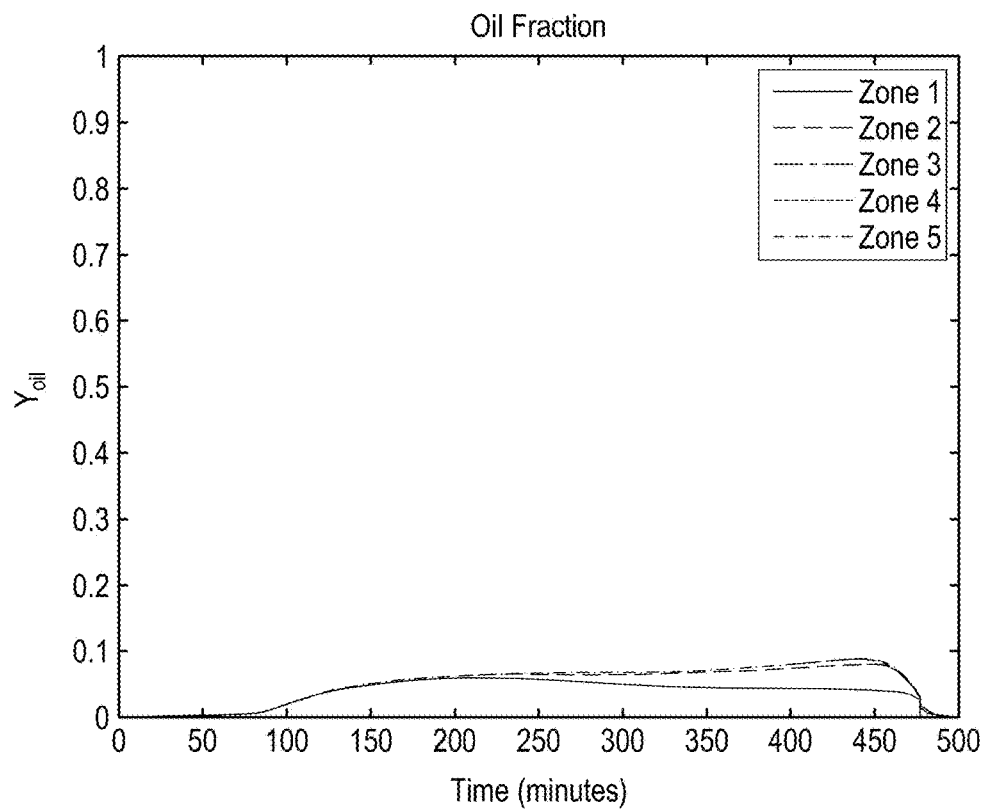
FIG. 17 illustrates oil mass fraction in pyrolysis gas
Figure 18:
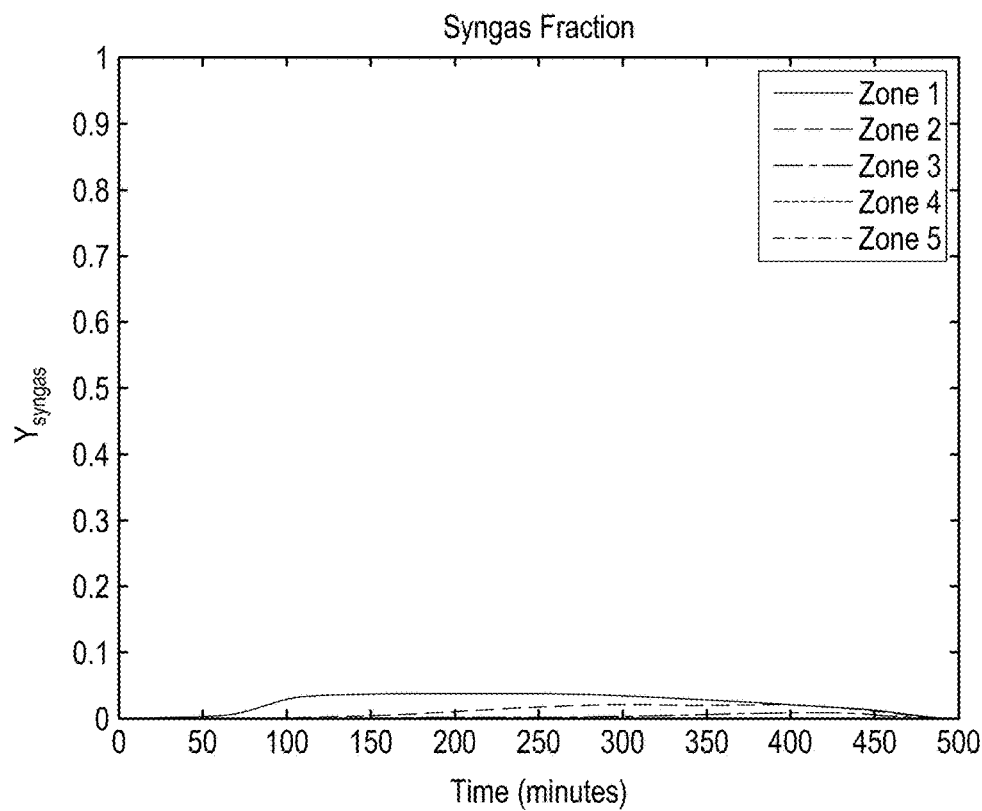
FIG. 18 illustrates syngas mass fraction in pyrolysis gas

The results presented in FIGS. 7-9 may be, at least partially, explained by the effect that the various conditions have on bed temperature. FIGS. 10-12 illustrate a calculation of bed temperature under conditions analogous to those presented in FIGS. 7-9, respectively. The temperature rise in the various zones displays a similar profile to the feedstock conversion profiles although, as expected, the temperature rise slightly precedes the conversion.

FIGS. 13-18 illustrate the expected production of the various pyrolysis products under conditions of bed settling and/or char removal.

G. Airlocks

Airlocks are devices with form a substantially airtight seal and facilitate the passage of material (e.g., feedstock and char) between chambers of the pyrolysis system. The airtight seal is desirable because it maintains a substantially oxygen-free environment within the reactor; a condition necessary for efficient pyrolysis. In particular, airlocks may be used to separate the feedstock supply line or feedstock hopper from the upper pressure vessel (or other reactor component into which fresh feedstock is added). An airlock also may be used to separate the bottom of the reaction vessel (e.g., the lower reaction chamber or plenum) from a removal apparatus that carries char and unreacted feedstock away from the reactor. The use of these airlocks, in combination, can yield a substantially continuous pyrolysis reactor apparatus in which fresh feedstock is continuously or intermittently fed into the reaction chamber and char removed, without having to cool the reactor (stopping the reaction), introducing air into the reaction vessel, and/or manually unload char from the reaction vessel as is typical of batch reactors. In certain reactor configurations it may be desirable to separate various reaction chambers from each other using an airlock.

FIGS. 1 and 2 depict airlock apparatus that facilitate the exchange of feedstock and char between the upper pressure vessel 101 and/or lower reaction chamber 102 and the rest of the system. As depicted in FIG. 1 (and further described in the embodiments discussed below), the airlock facilitates the loading of feedstock into the upper pressure vessel 101 when it is located above the upper pressure vessel 101; conversely, as depicted in FIG. 2 (and further described in the embodiments discussed below), the airlock also facilitates the removal of char from the lower reaction chamber 102 when it is located beneath the lower reaction chamber 102. Components that can serve as airlocks include, for example, rotary valves, knife valves including single, double, and triple knife valves, and flapgate valves including single, double, and triple flapgate valves.

It is significant that airlocks facilitate pyrolysis in at least three ways. First, they maintain a sealed and substantially oxygen-free environment (required for pyrolysis) within the upper pressure vessel 101 and lower reaction chamber 102 when no exchange of materials is occurring. Second, they facilitate the exchange of materials while simultaneously minimizing the amount of oxygen-containing air that is admitted into the upper pressure vessel 101 and lower reaction chamber 102 from the outside environment, thus increasing overall process efficiency. Third, when both are present in the same embodiment, they serve to provide a continuous functionality to an otherwise "static" batch reactor (see below for additional description).

H. Mass Transport Apparatus

A mass transport apparatus may be used for loading feedstock into the reactor and/or removing char and partially-reacted feedstock from the reactor. A mass transport apparatus is located outside of the reaction chambers. FIG. 1 depicts a mass transport apparatus for loading of feedstock into the upper pressure vessel 101, where the mass transport apparatus is embodied as both feedstock input 105 and char removal apparatus 104. FIG. 2 depicts a mass transport apparatus for removal of char from the lower reaction chamber 102 when embodied as an augur 104. Suitable mass transport apparatuses include, for example, augurs, conveyor belts, slurry feeders and pneumatic transport systems.

FIGS. 1 and 2 depict an embodiment in which the char may be removed by opening the airlock and allowing the char the fall through into the mass transport apparatus, depicted in this embodiment as auger. The airlock/mass transport apparatus may be used to remove char intermittently during a continuous pyrolysis reaction. Preferably, the airlock comprises a double valve (e.g., a double knife valve or double flapgate valve) in order to maintain a substantially airtight seal, thereby preventing the introduction of substantial quantities of oxygen into the plenum. Alternatively, the airlock/mass transport apparatus may be used to remove char and unreacted feedstock at the end of a batch run. Substantially airtight airlocks may not be necessary following a batch run if the reactor will be opened, e.g., for cleaning and maintenance. However, it may be desirable to maintain a substantially airtight airlock, even at the end of a batch run, to facilitate rapid emptying, reloading, and startup for pyrolysis of a subsequent batch. The mass transport apparatus for char removal is generally not airtight and is adapted to carry the char and any unreacted feedstock away from the reactor for disposal. The apparatus is generally adapted to withstand the high temperatures associated with the char as it exits the reactor. Preferably, the apparatus is adapted to cool the char during transport. Optionally, the mass transport apparatus and/or the char storage unit 110 is enclosed within a substantially gas-tight enclosure (although not necessarily airtight) and the enclosure further comprises an exhaust stack 111 to exhaust any off-gases produced after the char and unreacted feedstock has exited the reactor. Optionally, the exhaust stack 111 directs those off-gasses into the pyrolysis reactor.

A mass transport/airlock system, similar to the one described for char removal, may be used for loading feedstock into the reactor. The mass transport system directs fresh feedstock from a feedstock supply line or hopper into the reactor, preferably the upper pressure vessel. The mass transport system may comprise an augur, conveyor belt, slurry feeder, or pneumatic transport system to move the feedstock from a hopper to the reactor, or the feedstock may be gravity fed into the reactor directly from the hopper. The airlock preferably provides a substantially airtight seal in order that air/oxygen is not introduced into the reactor during pyrolysis. The reactor may be run in "batch" mode such that feedstock is added to the reactor only prior to initiating pyrolysis. Alternatively, the reactor may be run in a continuous mode such that the mass transport/airlock system introduces feedstock without stopping the pyrolysis reaction and/or opening the reactor to the atmosphere. When run in continuous mode, the airlock preferably provides a substantially airtight seal. Suitable airlocks useful for introducing feedstock into the reactor include, for example, rotary valves, knife valves including single, double, and triple knife valves, and flapgate valves including single, double, and triple flapgate valves.

II. Pyrolysis Process Using the Pyrolysis Apparatus

As depicted in FIG. 1, pyrolysis can occur in both the upper pressure vessel 101 and the lower reaction chamber 102. Pyrolysis is facilitated by process heating gas that flows into the lower reaction chamber 102 through gas inlets 106. After passing through the gas inlets 106, process heating gas passes first into the gas distribution space 203, then through the distribution screen 202 into the plenum 201. Depending on the embodiment, process heating gas may pass further into the upper pressure vessel 101, thus pre-heating additional feedstock (and distributing microwave-generated heat for embodiments that include microwave apparatus); alternatively, FIG. 4 depicts that process heating gas also may pass back through the distribution screen 202 into gas outlets in the lower reaction chamber 102.

Figure 3:
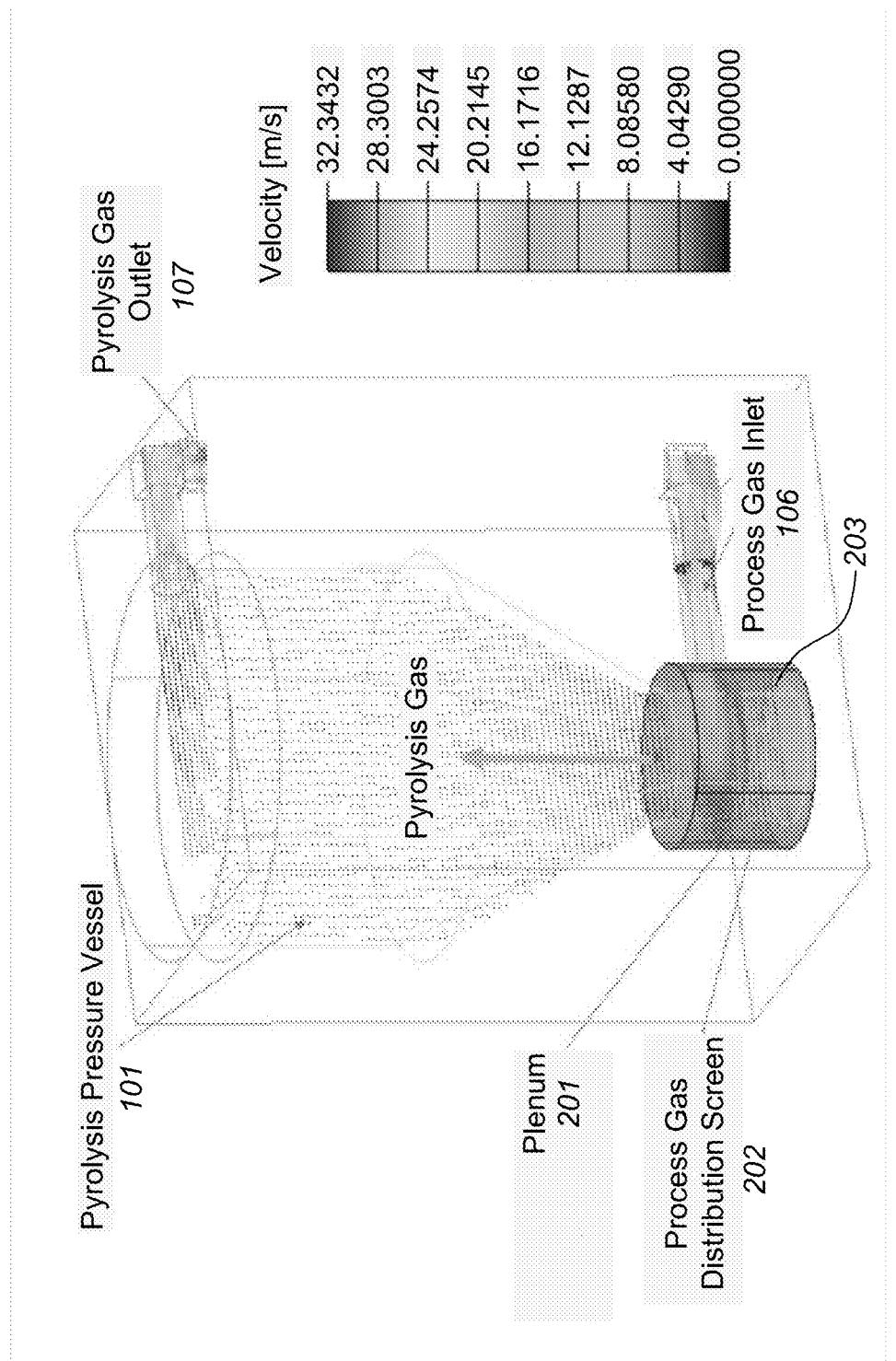
FIG. 3 illustrates a computed flow profile of process heating gas as it passes from the gas inlet into the lower reaction chamber and then into the upper pressure vessel.

The temperature of process heating gas on its introduction to the lower reaction chamber 102 is heated to any temperature appropriate to sufficiently heat the feedstock within the plenum and initiate and/or maintain pyrolysis, and/or heat the feedstock within the upper pressure chamber to initiate and/or maintain pyrolysis. It is understood that the process gas temperature may be determined in view of the existing temperature within the upper pressure chamber, the lower reaction vessel, and/or the plenum, and may be influenced by the number and location of secondary heat sources including, for example, microwave heating apparatuses and the presence of additional process gas inlets. For example, a pyrolysis reactor run in "full microwave mode" (i.e., when microwave heating initially is the sole energy source for heating the feedstock), the process gas may be relatively cool (e.g., 100-500° C.) and functions primarily as a heat transfer agent, distributing heat from the "hot spots" caused by uneven microwave heating to the "cold spots." In one embodiment, the process gas is used as a heat source to initiate or maintain pyrolysis and is heated to approximately 550-600° C. The flow velocity of process heating gas varies as a function of position within the upper pressure vessel 101 and lower reaction chamber 102; FIG. 3 shows a model calculation for one embodiment. The high level of the flow velocity of the process heating gas provides for enhanced mixing and heat transfer to the solids.

Pyrolysis begins to occur in the inventive apparatus when the temperature of feedstock is raised to at least 300° C. by the heated process gas, microwave heating, or a combination of both. As temperatures rise within the feedstock, retained moisture is released, and the progressively higher temperatures result in the combustion of the bed material using the initial oxygen in the system. As the feedstock reaches approximately 300° C. in the oxygen-starved environment, it begins to de-volatize into char, gasses and tars, i.e., pyrolysis reactions begin to convert the feedstock into the desired hydrocarbon-containing gases, liquids and other materials.

What is claimed is:

1. A non-fluidized bed pyrolysis reactor comprising an upper pressure vessel and a lower reaction chamber;
   wherein the reactor is configured to receive feedstock only prior to initiating pyrolysis such that there is no continuous supply of feedstock in the reactor;
   wherein the upper pressure vessel is configured to contain feedstock that is preheated;
   wherein the lower reaction chamber comprises:
      a gas-permeable distribution screen forming a centrally-disposed plenum and a laterally-disposed gas distribution space; and
      at least one process gas inlet in communication with the gas distribution space;
   wherein the plenum is configured to continuously receive the preheated feedstock falling from the upper pressure vessel by gravity;
   wherein the distribution screen is adapted to retain the feedstock within the plenum and the plenum is contiguous with the upper pressure vessel; and
   wherein the at least one process gas inlet is configured to:
      introduce, prior to initiation of the pyrolysis, a selected amount of an initial oxygen-containing gas into the lower reaction chamber for combustion of the feedstock, the combustion of the feedstock heating the feedstock to initiate the pyrolysis, the combustion of the feedstock being initiated via a high temperature of the initial oxygen-containing gas, microwave heating in the reactor, or a combination thereof, the combustion and the pyrolysis generating a heating gas; and
      introduce, during the pyrolysis, only the heating gas into the lower reaction chamber, wherein the heating gas exits from the upper pressure vessel and is heated prior to entering the at least one process gas inlet to reach a temperature for sustaining the pyrolysis.

2. The pyrolysis reactor of claim 1, wherein the at least one process gas inlet includes a plurality of process gas inlets in communication with the gas distribution space.

3. The pyrolysis reactor of claim 1, wherein the lower reaction chamber comprises one or more process gas outlets in communication with the gas distribution space.

4. The pyrolysis reactor of claim 1, wherein the gas distribution space further comprises one or more baffles each contacting an interior side of an outer wall of the lower reaction chamber and extending across at least a portion of a width of the gas distribution space, wherein a plurality of openings are defined in the outer wall of the lower reaction chamber, the gas distribution space is in communication with a plurality of conduits respectively via the plurality of openings, each of the plurality of conduits is one of the at least one process gas inlet or is a process gas outlet, the openings are distributed evenly and circumferentially about a center of the lower reaction chamber, and each of the baffles is positioned between two neighboring openings of the openings.

5. The pyrolysis reactor of claim 1, wherein the pyrolysis reactor further comprises one or more microwave waveguides configured to emit microwaves into the interior of the plenum.

6. The pyrolysis reactor of claim 5, wherein the waveguide further comprises a quartz window.

7. The pyrolysis reactor of claim 6, wherein the pyrolysis reactor further comprises a gas nozzle configured to direct a cleaning gas onto the quartz window.

8. The pyrolysis reactor of claim 1, wherein the pyrolysis reactor further comprises one or more microwave waveguides configured to emit microwaves into the interior of the upper pressure vessel.

9. The pyrolysis reactor of claim 8, wherein the waveguide further comprises a quartz window.

10. The pyrolysis reactor of claim 9, wherein the pyrolysis reactor further comprises a gas nozzle configured to direct a cleaning gas onto the quartz window.

11. The pyrolysis reactor of claim 1, wherein the pyrolysis reactor further comprises an airlock disposed at the bottom of the plenum, an exit port and a removal apparatus, and wherein the airlock provides a substantially airtight seal between the plenum and the removal apparatus.

12. The pyrolysis reactor of claim 11, wherein the airlock comprises a rotary valve, a knife valve or a double flapgate valve.

13. The pyrolysis reactor of claim 11, wherein the removal apparatus is selected from the group consisting of a discharge augur, a conveyor belt, and a bucket conveyor system.

14. The pyrolysis reactor of claim 1, wherein the pyrolysis reactor further comprises a feedstock input disposed at the top of the upper pressure vessel, wherein the feedstock input comprises an airlock which provides a substantially airtight seal between the upper pressure vessel and the feedstock input.

15. The pyrolysis reactor of claim 14, wherein the airlock comprises a rotary valve, a knife valve or a flapgate valve.

16. The pyrolysis reactor of claim 1, wherein the upper pressure vessel further comprises one or more gas outlets.

17. The pyrolysis reactor of claim 16, wherein at least one of the gas outlets of the upper pressure vessel is operably linked to a sensor.

18. The pyrolysis reactor of claim 17, wherein the sensor detects a gas flow rate or a gas flow velocity.

19. The pyrolysis reactor of claim 17, wherein the sensor detects feedstock packing.

20. The pyrolysis reactor of claim 1, wherein the upper pressure vessel further comprises a stirring device.

21. The pyrolysis reactor of claim 20, wherein the stirring device is a rotary paddle or an augur.

22. The pyrolysis reactor of claim 12, wherein the airlock comprises a double flapgate valve.

* * * * *